R. WARD.
Smut Machine.
No. 25,594. Patented Sept. 27, 1859.
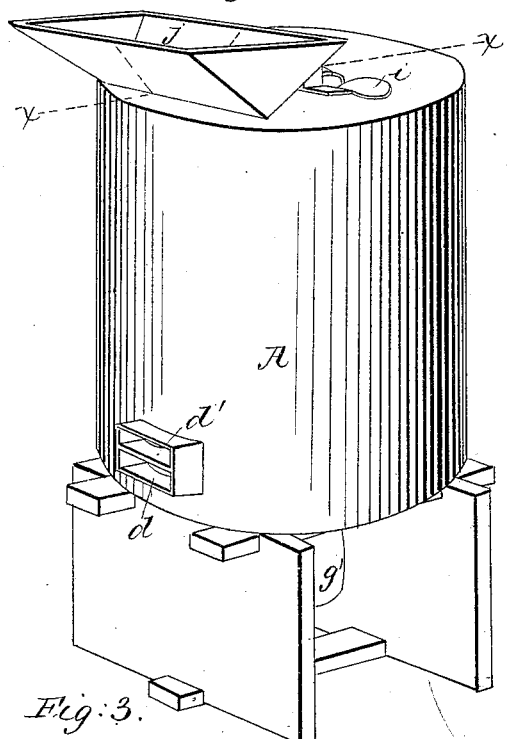
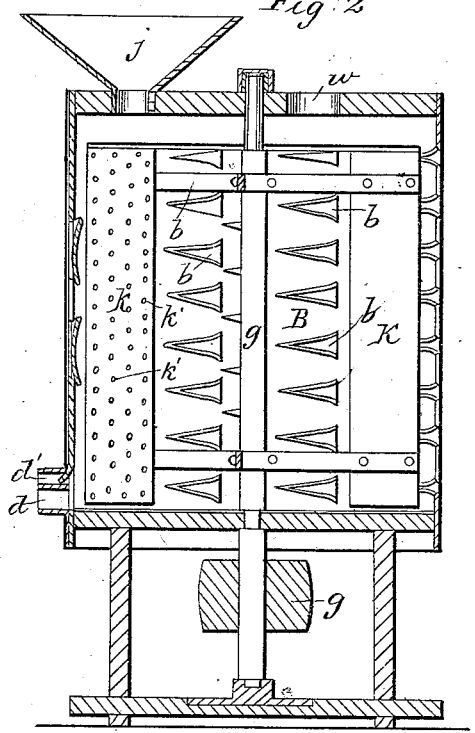
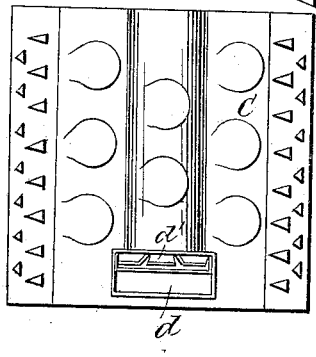
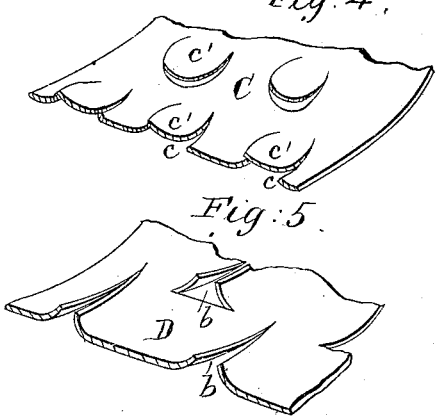
Witnesses
H. E. Clifton
F. A. McDowell
Inventor
Richard Ward

UNITED STATES PATENT OFFICE.

RICHARD WARD, OF EDINBURG, INDIANA.

SMUT-MACHINE.

Specification of Letters Patent No. 25,594, dated September 27, 1859.

*To all whom it may concern:*

Be it known that I, RICHARD WARD, of Edinburg, in the county of Johnson and State of Indiana, have invented a new and useful Improvement in Smut-Machines; and I do hereby declare that the following is a full and clear description thereof, reference being had to the accompanying drawings and to the letters of reference marked thereon and made to form a part of this specification.

The nature of my invention relates to the preparation of the iron plates, which form the cylinder within which the grain is operated upon, and their arrangement, in the formation of said cylinder.

In reference to the accompanying drawings Figure 1, is a perspective view of the machine. Fig. 2 is a vertical sectional elevation showing a partial interior view of the cylinder. Fig. 3, is a sectional view of the perforated plate of the cylinder, showing the manner of corrugating the plate through which the smut escapes from the cylinder. Fig. 4 is a sectional view of the smut plate, showing the peculiar form of its perforations. Fig. 5, is a sectional view of the scouring plate, showing the form of its perforations.

(A) represents the shell or outer covering of the cylinder, made to fit closely upon the perforated cylinder (B). The said perforated cylinder is composed, or constructed, in part of iron plates, having the diamond shaped perforations (b) shown clearly in Fig. 5, and in part of the corrugated iron plates (C) having the horse shoe perforations (c) shown clearly in Fig. 4. The perforations (b) of the scouring plate (D) are made in such manner as to leave the sharp cutting edges of the perforated iron, projecting inwardly, by means of which the grain may be most effectually scoured, and separated from the smut and chaff; the corrugated plate (C) is arranged in that part of the cylinder next the discharge openings (d d') as clearly shown in Fig. 3; so that as the smut and chaff, escaping through the perforations (c) of the plate (C) may pass down the corrugations (f) between the perforated cylinder (B) and the shell (A) to the discharge opening (d').

(g) is a shaft provided with a driving pulley ($g^1$), passing through and having bearings, in the upper and lower ends of the cylinder as shown fully in Fig. 2. Attached to the shaft (g) within the cylinder are arms (h) provided at their extremities with beaters (k). The beaters (k) are furnished with numerous projecting spikes, which serve to assist in the scouring of the grain.

(j) is a hopper through which grain may be fed to the machine.

(l) is an opening, through which air may be admitted to the cylinder to facilitate the escape of the smut and chaff. The beaters (k) acting on the principle of a fan, in their rotation, create a strong draft, which may be supplied and regulated by means of the valve (i) which is arranged to cover the opening (l) so the proper quantity of air to insure the discharge of the smut and chaff may be admitted to the cylinder, with reference to the condition of the grain to be operated on.

The operation of the machine may be described as follows: the shaft (g) being made to rotate, by means of the pulley (g') operated by a suitable band, the beaters (k) will be made to operate. Grain now being fed to the machine will be caught by the projections (k') of the beaters (k) and forced alternately against the sharp edges of the perforated plate (D) as before described, by means of which the grain will be rapidly and thoroughly scoured, and the smut and chaff, beat into fine dust which will escape through the perforations (c) of the plate (C) to the corrugations (f) and thence to the discharge opening (d') as before described while the cleansed grain falls to the lower part of the cylinder and is discharged at the opening (d). The beaters (k) are always made to rotate in the direction of the lips (c') of the plate (C), so that while the smut, chaff, etc., is permitted to escape, through the perforations (c) the grain is prevented from escaping, its weight, and the force imparted to it being sufficient to carry it beyond said perforations.

The advantages claimed for this invention are a most rapid and thorough scouring of the grain, and perfect separation and discharge of the smut, chaff, etc.

Having described the construction and operation of my invention, what I claim, and desire to secure by Letters Patent is—

The employment of the corrugated iron plate (C) having the horseshoe perforations (c) in combination with the iron plate (D) having the diamond perforations (b) in the construction of a perforated scouring and separating cylinder (B) all being arranged to operate substantially as and for the purposes set forth.

In testimony of which invention I have hereunto set my hand.

In presence of—

RICHARD WARD.

F. A. McDowell,
H. E. Clifton.